United States Patent
Oostveen et al.

(10) Patent No.: US 6,718,287 B2
(45) Date of Patent: Apr. 6, 2004

(54) WATERMARK DETECTION

(75) Inventors: Job Cornelis Oostveen, Eindhoven (NL); Antonius Adrianus Cornelis Maria Kalker, Eindhoven (NL); Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 80 days.

(21) Appl. No.: 09/862,282

(22) Filed: May 22, 2001

(65) Prior Publication Data

US 2002/0013681 A1 Jan. 31, 2002

(30) Foreign Application Priority Data

May 23, 2000 (EP) .............................................. 00201786

(51) Int. Cl.$^7$ .............................................. G06F 15/00
(52) U.S. Cl. ...................................... 702/189; 713/176
(58) Field of Search ............................ 702/189, 66, 69, 702/73–79, 106, 124–126, 179, 181, 183; 380/54, 252; 713/176

(56) References Cited

U.S. PATENT DOCUMENTS

| | | | | |
|---|---|---|---|---|
| 6,026,193 A | * | 2/2000 | Rhoads | 382/232 |
| 6,064,737 A | * | 5/2000 | Rhoads | 713/176 |
| 6,252,972 B1 | * | 6/2001 | Linnartz | 382/100 |
| 6,320,965 B1 | * | 11/2001 | Levine | 380/34 |
| 6,393,140 B1 | * | 5/2002 | Itako | 382/135 |
| 6,404,898 B1 | * | 6/2002 | Rhoads | 382/100 |
| 6,484,191 B1 | * | 11/2002 | Alexandru | 708/200 |
| 6,567,532 B1 | * | 5/2003 | Honsinger | 382/100 |

FOREIGN PATENT DOCUMENTS

| | | | | |
|---|---|---|---|---|
| WO | WO9912347 | | 3/1999 | H04N/5/913 |
| WO | WO 9912347 | * | 3/1999 | H04N/5/913 |

OTHER PUBLICATIONS

Hogg et al., "Applied Statistics for Engineers and Physical Scientists", 1992, Macmillan Publishing Company, Edition 2, pp. 126, 127, and 182.*

* cited by examiner

*Primary Examiner*—Marc S. Hoff
*Assistant Examiner*—Mary Catherine Baran

(57) ABSTRACT

A method and arrangement for detecting a watermark in a suspect signal, in which the watermark is embedded by adding a watermark pattern w to a signal p with a given embedding strength s ("additive embedding": q=p+sw), includes correlating (2,3) it with the suspect signal. Recently, "multiplicative embedding" has been proposed (q=p(1+sw)). In this case, multiplicatively embedded watermarks are detected by raising (1) the signal to a power β prior to correlating it with the watermark. The power β may be fixed (e.g., β=2) or derived from a statistical analysis (5) of the signal.

12 Claims, 1 Drawing Sheet

WATERMARK DETECTION

BACKGROUND OF THE INVENTION

1. Field of the Invention

The invention relates to a method and arrangement for detecting a watermark in a signal.

2. Description of the Related Art

Watermarking of audio and video material is an important building block in copy protection schemes. A watermark is an additional piece of information which is embedded in the content. Preferably, the embedded watermark is imperceptible, survives A/D and D/A conversion, survives compression techniques, and is robust against various signal- processing algorithms.

A watermark is generally embedded in a signal by modifying samples of the signal in accordance with respective samples of the watermark. The expression "samples" refers to signal values in the domain in which the watermark is embedded. Samples may be, for example, temporal variables, such as sound intensities of an audio signal, spatial variables, such as luminance values of a picture, or coefficients representing a signal after a suitable transform.

A known method of detecting an embedded watermark in a signal is disclosed in International Patent Application WO-A-99/12347, corresponding to U.S. Pat. No. 6,252,972. The method comprises the steps of correlating the suspect signal with the watermark to be detected, and detecting whether the amount of correlation exceeds a predetermined threshold.

The known detection method is optimal for detecting "additively embedded" watermarks. The expression "additive embedding" refers to systems in which the watermark has been added to the original signal in accordance with:

$$Q=P+sW$$

where Q is the watermarked signal, P is the original signal, W is the watermark, and s represents the strength of embedding. The same detection method is also used in embedding systems in which the embedding strength is locally adapted to the signal content:

$$Q=P+S(P)W$$

where S(P) is referred to as a perceptual mask.

A special class of perceptual masking, which has recently been introduced for image watermarking, is obtained when the embedding strength S(P) is substantially proportional to the signal itself: S(P)=sP. This "multiplicative embedding" method can be mathematically expressed as $$Q=P(1+sW).$$

It has been found that straightforward correlation of the suspect signal with the watermark is not optimal for detecting the presence of such a multiplicatively embedded watermark.

SUMMARY OF THE INVENTION

It is an object of the invention to provide an improved method and arrangement for detecting a watermark, which has been embedded, using a perceptual mask and, more particularly, for detecting a multiplicatively embedded watermark.

To this end, the invention provides a method and arrangement for detecting a watermark in a signal as defined in the independent claims. It has been found by the inventors that the presence of a multiplicatively embedded watermark can be more reliably detected by first squaring the signal samples before correlating the signal with the watermark. More generally, the presence of a watermark, which is embedded, using a perceptual mask should be detected by raising the suspect signal to a power b which is not equal to 1.

Advantageous embodiments of the method and arrangement are defined in the dependent claims.

BRIEF DESCRIPTION OF THE DRAWINGS

The FIGURE shows a schematic diagram of an arrangement for detecting a watermark in accordance with the invention.

DESCRIPTION OF THE PREFERRED EMBODIMENTS

Figure 1:
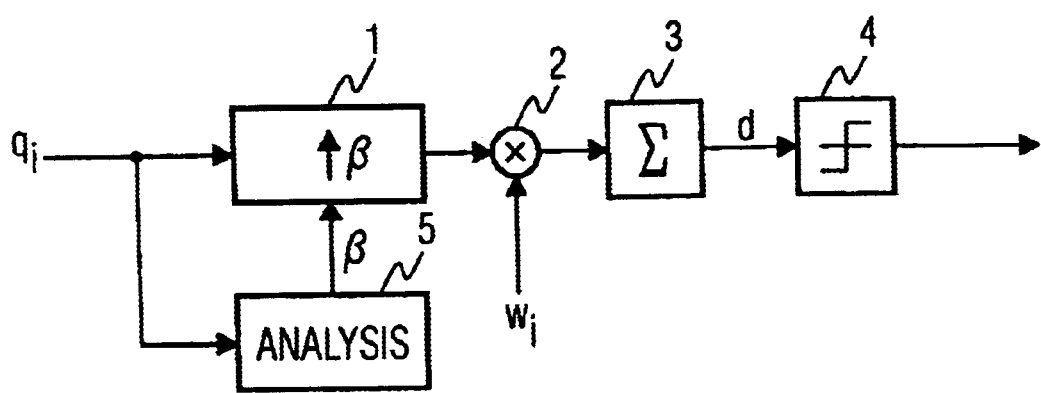

The arrangement shown in the FIGURE receives samples $q_i$ of a suspect signal Q where the index i denotes a one-dimensional variable (such as discrete instants of time of a digital audio signal), or a two-dimensional variable (such as spatial locations of pixels of an image or locations of DCT or DFT frequency coefficients of a transformed image). The signal samples $q_i$ have been generated by embedding a watermark W in an original signal Q in accordance with:

$$q_i=p_i(1+sw_i)$$

where pi denotes samples of the original signal P, $w_i$ denotes corresponding samples of the watermark W, and s represents the embedding strength. The watermark is usually a (temporal or spatial) noisy pattern of +1 and −1 values.

The arrangement comprises a processing circuit 1, a multiplier 2, a summing circuit 3, and a threshold detector 4. The processing circuit 1 raises the samples $q_i$ of the suspect signal Q to a power $\beta$. The multiplier 2 and summing circuit 3 jointly constitute a correlation circuit which calculates the correlation between the received signal and the watermark which is to be detected, in accordance with:

$$d = \frac{1}{N}\sum_{i=1}^{N} q_i^\beta w_i.$$

where N denotes the total number of samples constituting the watermark. The amount of correlation constitutes a decision variable d which is applied to the threshold detector 4 and therein compared with a predetermined threshold. If the correlation exceeds said threshold, the watermark W is said to be present in the suspect signal, otherwise it is not.

The invention is based on the assumption that the samples pi are usually distributed according to the Weibull probability density function:

$$f_w(p) = \frac{\alpha}{\beta}\left(\frac{p}{\alpha}\right)^{\beta-1} e^{-\left(\frac{p}{\alpha}\right)^\beta}.$$

The power $\beta$ to which the suspect samples $q_i$ are raised by processing circuit 1 is selected to be equal to the parameter $\beta$ of said Weibull probability density function.

In an embodiment, the arrangement includes an analysis circuit 5 which, under the assumption that the signal can indeed so be modeled, determines the parameter $\beta$ of said Weibull probability density function. The parameter $\beta$ is then applied to the processing circuit 1. However, a fixed predetermined value for β may be used as well. Preferably, the value is larger than 1.

A special case of the Weibull distribution is the Rayleigh distribution with parameter σ, for which β=2, α=√2σ. Accordingly, under the assumption that the original signal can be modeled by a Rayleigh distribution, the optimal detection consists of squaring the samples and subsequently correlating with the watermark:

$$d = \frac{1}{N}\sum_{i=1}^{N} q_i^2 w_i.$$

DCT coefficients are usually modeled by the Weibull distribution. The Rayleigh distribution is particularly suitable for modeling Fourier coefficients. In view thereof, it is advantageous to use the fixed value β=2 for signals that have been watermarked in the DCT or Fourier domain.

Disclosed is a method and arrangement for detecting a watermark in a suspect signal. Usually, a watermark is embedded by adding a watermark pattern w to a signal p with a given embedding strength s ("additive embedding": q=p+sw). The embedded watermark is then detected by correlating (2,3) it with the suspect signal.

Recently, "multiplicative embedding" has been proposed (q=p(1+sw)). In accordance with the invention, multiplicatively embedded watermarks are detected by raising (1) the signal to a power b prior to correlating it with the watermark. The power β may be fixed (e.g., β=2) or derived from a statistical analysis (5) of the signal.

What is claimed is:

1. A method of detecting a watermark in a signal, the method comprising the steps:

raising the samples of said signal to a power β unequal to 1 forming a signal raised to the power β;

correlating the signal raised to the power β with the watermark forming a correlation value; and detecting whether said correlation value exceeds a predetermined threshold.

2. The method as claimed in claim 1, wherein said power β is a predetermined value larger than 1.

3. The method as claimed in claim 2, wherein said power β is equal to 2.

4. The method as claimed in claim 1, wherein said method further comprises the steps:

analyzing at least one statistical property of the signal; and selecting the power β in accordance with said statistical property.

5. The method as claimed in claim 4, wherein said statistical properties are the mean value and the variance of the signal.

6. The method as claimed in claim 4, wherein said at least one statistical property is the parameter β of the probability density function $$f_w(p) = \frac{\alpha}{\beta}\left(\frac{p}{\alpha}\right)^{\beta-1} e^{-\left(\frac{p}{\alpha}\right)^\beta}.$$

7. An arrangement for detecting a watermark in a signal, the arrangement comprising:

means for raising the samples of said signal to a power β unequal to 1 forming a signal raised to the power β;

means for correlating the signal raised to the power β with the watermark forming a correlation value; and means for detecting whether said correlation value exceeds a predetermined threshold.

8. The arrangement as claimed in claim 7, wherein said power β is a predetermined value larger than 1.

9. The arrangement as claimed in claim 7, wherein said power β is equal to 2.

10. The arrangement as claimed in claim 7, wherein said arrangement further comprises:

means for analyzing at least one statistical property of the signal; and means for selecting the power β in accordance with said statistical property.

11. The arrangement as claimed in claim 10, wherein said statistical properties are the mean value and the variance of the signal.

12. The arrangement as claimed in claim 10, wherein said at least one statistical property is the parameter β of the probability density function $$f_w(p) = \frac{\alpha}{\beta}\left(\frac{p}{\alpha}\right)^{\beta-1} e^{-\left(\frac{p}{\alpha}\right)^\beta}.$$

* * * * *